(12) United States Patent
Shihadeh

(10) Patent No.: US 6,653,867 B1
(45) Date of Patent: Nov. 25, 2003

(54) APPARATUS AND METHOD FOR PROVIDING A SMOOTH TRANSITION BETWEEN TWO CLOCK SIGNALS

(75) Inventor: Elias Shihadeh, Nazareth (IL)

(73) Assignee: Advanced Micro Devices, Inc., Sunnyvale, CA (US)

( * ) Notice: Subject to any disclaimer, the term of this patent is extended or adjusted under 35 U.S.C. 154(b) by 21 days.

(21) Appl. No.: 10/122,551

(22) Filed: Apr. 11, 2002

Related U.S. Application Data

(60) Provisional application No. 60/295,710, filed on Jun. 4, 2001.

(51) Int. Cl.[7] .............................. H03K 17/00; G06F 1/04
(52) U.S. Cl. ........................... 326/96; 326/93; 327/407; 327/99; 327/298; 713/501
(58) Field of Search ........................ 326/93–98; 327/99, 327/166, 176, 199, 294, 298, 407; 375/354; 713/501

(56) References Cited

U.S. PATENT DOCUMENTS

| | | | | |
|---|---|---|---|---|
| 5,652,536 A | * | 7/1997 | Nookala et al. ............ | 327/298 |
| 6,107,841 A | * | 8/2000 | Goodnow ..................... | 327/99 |
| 6,323,715 B1 | * | 11/2001 | Vatinel ........................ | 327/407 |
| 6,411,135 B2 | * | 6/2002 | Komoto ........................ | 327/99 |
| 6,453,425 B1 | * | 9/2002 | Hede et al. .................. | 713/501 |
| 6,559,679 B2 | * | 5/2003 | Kim ............................. | 326/93 |
| 6,563,349 B2 | * | 5/2003 | Menezes et al. .............. | 327/99 |

\* cited by examiner

*Primary Examiner*—Vibol Tan

(57) ABSTRACT

An apparatus and method is disclosed for providing a smooth transition between a first clock signal at a first frequency and a second clock signal at a lower second frequency. A pulse is generated that indicates whether the logic levels of the first and the second clock signals are similar or are different. The rising/falling edges of the pulse are synchronized with the rising/falling edges of the first clock signal. When a change in a logic level of a command signal for switching between the clock signals is detected, a first time period is identified in which the logic levels of the first and the second clock signals are different. The transition between the first clock signal and the second clock signal is allowed immediately after the first time period has ended.

20 Claims, 5 Drawing Sheets

APPARATUS AND METHOD FOR PROVIDING A SMOOTH TRANSITION BETWEEN TWO CLOCK SIGNALS

The present invention claims priority to U.S. Provisional Application Serial No. 60/295,710 filed Jun. 4, 2001.

FIELD OF THE INVENTION

The present invention relates to the field of digital circuits. More particularly, the invention relates to an apparatus and method for providing a smooth transition between two clock signals of different frequencies that drive a digital circuit.

BACKGROUND OF THE INVENTION

Clock pulses drive digital circuits. In many cases, digital circuits utilize more than one clock source. Because the clock frequency of each clock may differ, there may be faster clocks and slower clocks that drive the same digital circuit. When more than one clock source drives the same digital circuit, a special circuit is required to select which clock is to drive the digital circuit. In switching between two clock sources, a glitch on the output clock may be created. A glitch may be in the form of a short pulse (also referred to as a spike). A glitch sometimes leads to faulty behavior of the digital circuit if the digital circuit contains elements that receive the clock signal (e.g., flip-flop circuits) The faulty behavior can cause a reduction in the performance of the digital circuit, especially in digital circuits that require high levels of accuracy.

U.S. Pat. No. 5,790,609 discloses a circuit that switches between a plurality of clock sources to provide one clock at a time. The circuit comprises a clock acquisition subsystem for a data processing system. The clock acquisition subsystem comprises an interlocked clock multiplexer for acquiring a clock source which is provided as the clock signal to the data processing system. The multiplexer has at least two inputs for clock source signals. A control register specifies the clock source to be selected by the multiplexer. The multiplexer has an interlocked synchronizer on each clock signal input so that when the multiplexer is switched, the output clock signal shifts cleanly from a first clock source to a second clock source without glitches or runt pulses. However, the switch delay lasts for two periods of the output clock, plus two periods of the selected clock. This period adds a delay that equals the period of the slowest clock in the worst case, thus reducing the accuracy of the system, particularly if the circuit is a high resolution timer.

U.S. Pat. No. 5,604,452 discloses a circuit that switches between two clock signals to produce an output clock signal without a glitch or short pulse. The circuit comprise a three-input multiplexer controlled by a modified two-bit state machine. The state machine includes flip-flop memories that are driven by two different clocks. The state machine output is used to control the three-input multiplexer, selecting between the first clock, the second clock and an intermediate high level signal during transition. The intermediate high level signal bridges the gap between pulses, eliminating any short pulse glitches. However, the switching is done after one edge of the first clock and one edge of the second clock. The total delay is the sum of the delay of the two clocks, which will always take the time of the slowest clock. This feature increases delays and reduces the accuracy of the system, particularly if the output clock drive is a high resolution clock drive. Moreover, the switching is done in three stages. The first stage occurs at the rising edge of the output clock (i.e., the point in time in which pulse changes the voltage level from low voltage to high voltage). The second stage occurs when the output goes to a high level (logic level "1") for a. period of time. The third stage occurs at the rising edge of the selected clock.

U.S. Pat. No. 5,652,536 discloses a clock switching circuit that is responsive to at least one clock select signal. The clock switching circuit switches between a plurality of clock signals while minimizing transients generated during the switching. The circuit comprises at least one flip-flop that receives a corresponding at least one clock select signal. The circuit also comprises a plurality of flip-flops that individually receive an output of a corresponding one of the at least one flip-flop, and an inverted version of a corresponding one of the clock signals. The circuit also comprises a plurality. of AND gates that individually receive the output of a corresponding one of the at least one flip-flop, the output of a corresponding one of the plurality of flip-flops, and a corresponding one of the plurality of clock signals, and an OR gate that receives the outputs of the AND gates so that the selected one of the plurality of clock signals is provided at an output of the OR gate, and fed back to an inverted clock input of the at least one flip-flop. Timing of the clock switching circuit is such that a first clock signal is provided to the circuit until a first falling edge (i.e., the moment in time where the pulse changes its voltage level from high to low) of-the first clock signal occurs following an indication to change clock signals.

A second clock signal is provided to the circuit after a first falling edge of the second clock signal occurs, following the first falling edge of the first clock signal, following the indication to change clock signals. The switching between the clocks starts by turning off the output clock, then, after a delay of up to one period of the selected clock, turning on the output, with the new selected clock as the output clock. However, if the selected clock is the slower clock, then there will be a delay of up to one period of the slowest clock. This adds a delay that is equal to the period of the slowest clock, thus reducing the accuracy of the system, particularly if the circuit is a high resolution timer.

A glitch may occur where a digital system has one reference clock source that generates several other clocks with lower frequencies and at least one of the generated clocks has a frequency that is equal to the reference clock frequency divided by an odd number (e.g., 3, 5, 7, etc.). In such cases the odd number generated clock may switch at different edges of the reference clock, such that its rising edge will be after the rising edge of the reference clock and its falling edge will be after the falling edge of the reference clock.

All the apparatus and methods described above have not yet provided a satisfactory solution to the problem of operating a digital system with two clock sources having different frequencies.

It would be desirable to have an apparatus and method for preventing glitches that occur on an output signal during the process of switching between two clock sources in a digital circuit where one clock source is slower than the other clock source by an odd ratio.

It would be desirable to have an apparatus and method for reducing delay when switching between two clock sources in a digital circuit.

It would also be desirable to have an apparatus and method for increasing the accuracy of a digital system when switching between two clock sources, particularly when the digital system is to be used in a high resolution timer or counter.

It would also be desirable to have an apparatus and method for preventing delay that occurs during the process of switching between two clock sources, when one clock source is considerably faster than the other clock source.

SUMMARY OF THE INVENTION

The present invention is directed to an apparatus and method for providing a smooth transition when switching between two clock sources in a digital circuit where one clock source is slower than the other clock source.

An advantageous embodiment of the present invention comprises circuitry for generating a pulse that indicates when the logic levels of the first and the second clock signals are similar and when they are different. The rising/falling edges of the pulse are synchronized with the rising/falling edges of the first clock signal. When a change in a logic level of a command signal for switching between the clock signals is detected, a first time period is identified in which the pulse is in a logic level that indicates that the logic levels of the first and second clock signals are different. The transition between the first clock signal and the second clock signal is allowed immediately after the first time period has ended so that the logic level of the second clock signal is essentially equal to the logic level of the first clock signal after the transition is completed.

It is an object of the present invention to provide an apparatus and method for switching between two clock sources in a digital system.

It is also an object of the present invention to provide an apparatus and method for switching between two clock sources in a digital system where one clock source is slower than the other clock source by an odd ratio.

It is an object of the present invention to provide an apparatus and method for reducing delay when switching between two clock sources in a digital system.

It is another object of the present invention to provide an apparatus and method for increasing the accuracy of a digital system when switching between two clock sources, particularly when the digital system is used in a high resolution timer or counter.

It is another object of the present invention to provide an apparatus and method for switching between two synchronous clocks that have an odd ratio between their frequencies, in which the rising edge of the slowest clock is synchronized to the rising edge of the fastest clock, and in which the falling edge of the slowest clock is synchronized to the falling edge of the fastest clock.

It is still another object of the present invention to provide an apparatus and method for solving the problem of the delay that occurs during the process of switching between two clock sources, when one clock source is considerably faster than the other clock source.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should. appreciate that they may readily use the conception and the specific embodiment disclosed as a basis for modifying or designing other structures for carrying out the same purposes of the present invention. Those skilled in the art should also realize that such equivalent constructions do not depart from the spirit and scope. of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," ""processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which.

DETAILED DESCRIPTION OF THE INVENTION

FIGS. 1 through 3c, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged digital circuit having two clock sources.

Figure 1A:
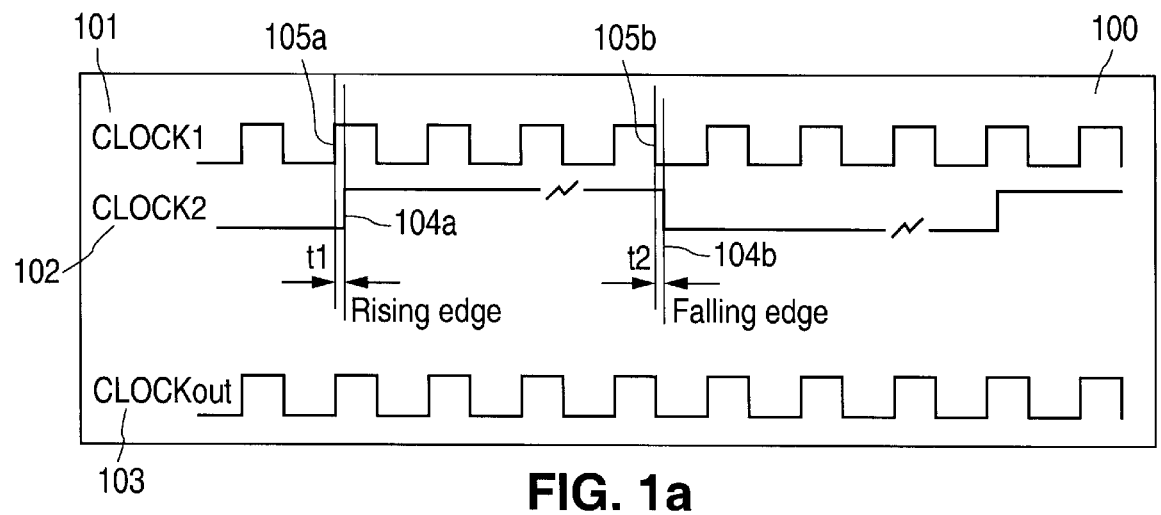
FIGURE 1a illustrates a prior art timing diagram showing a time relation between two clock sources and a clock output signal along a time axis.
Figure 1B:
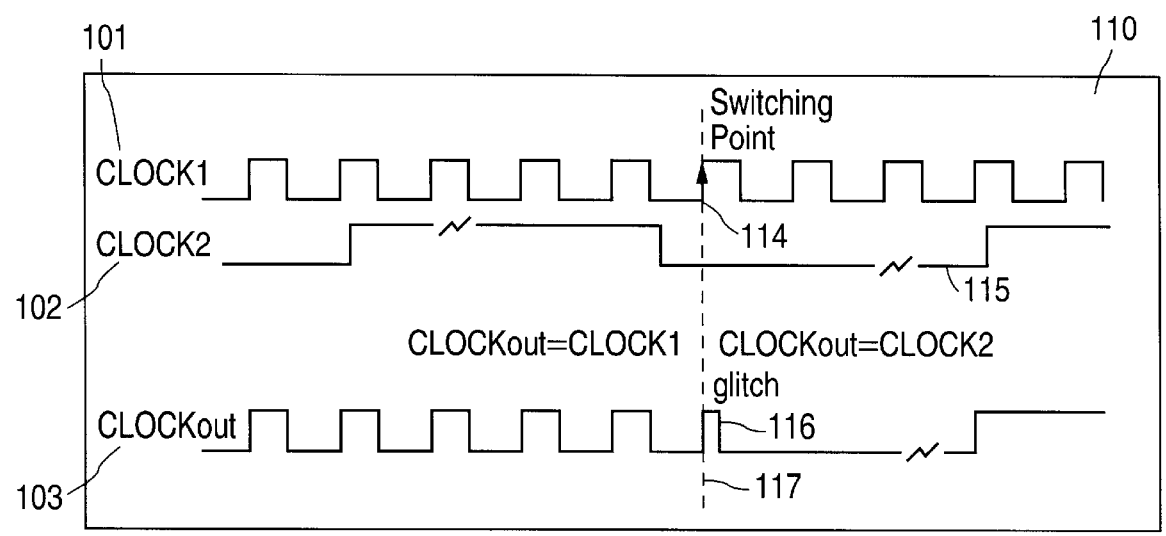
FIGURE 1b illustrates a prior art timing diagram showing a time relation between two clock sources and a clock output signal along a time axis showing a how glitch may occur at a switching point on the rising edge of a faster clock source.
Figure 1C:
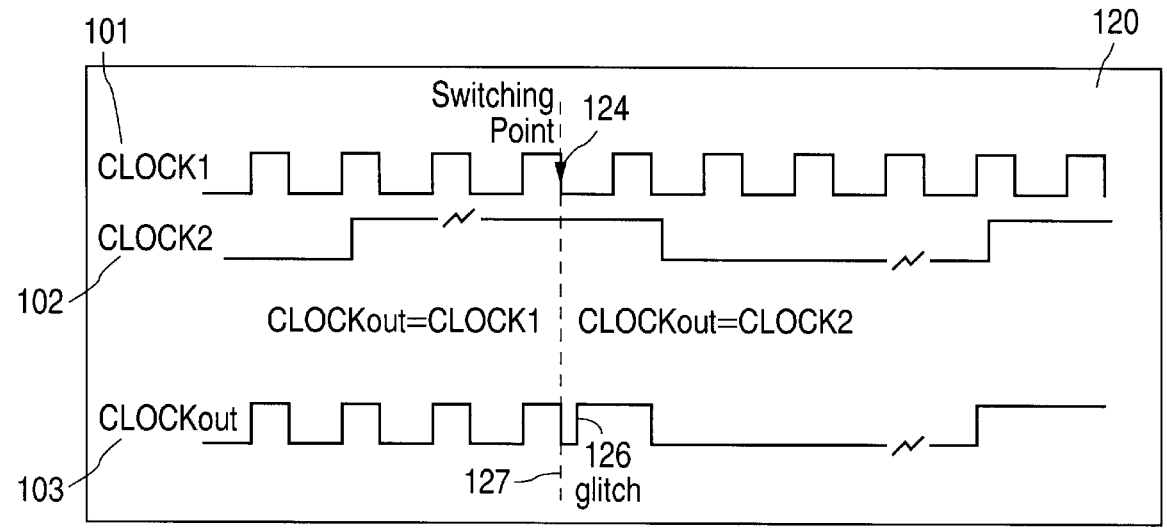
FIGURE 1c illustrates a prior art timing diagram showing a time relation between two clock sources and a clock output signal along a time axis showing a how glitch may occur at a switching point on the falling edge of a faster clock source.

As previously described, a glitch (or short pulse) may occur when a switch is made from one clock source to another clock source in a digital circuit. FIG. 1a, FIG. 1b, and FIG. 1c illustrate prior art timing diagrams that show how a glitch may occur.

FIG. 1a illustrates a time relation between two clock sources, CLOCK1 101 and CLOCK2 102, and a clock output signal, CLOCKout 103, along time axis 100. The two clock sources, CLOCK1 101 and CLOCK2 102, are used as sources for driving a given digital circuit (not shown). CLOCK1 101 has higher frequency than CLOCK2 102 (i.e., CLOCK1 101 has more clock pulses than CLOCK2 102 during a given period of time). In the example shown in FIG. 1a the frequency of CLOCK1 101 is approximately three and one half (3.5) times the frequency of CLOCK2 102. CLOCKout 103 represents a clock output signal along time axis 110 that drives the given digital circuit (not shown).

The Rising Edge 104a of CLOCK2 102 follows the Rising Edge 105a of CLOCK1 101 with a Short Delay Time t1. The Falling Edge 104b of CLOCK2 102 follows the Falling Edge 105b of CLOCK1 101 by a Short Delay Time t2. As a starting state, CLOCK1 101 is selected to drive the given digital circuit. The initial clock output, as represented by CLOCKout 103, is identical to the CLOCK1 101 signal.

The switching between CLOCK1 101 and CLOCK2 102 should be performed in synchronization with CLOCK1 101 (i.e., the faster clock) in order to minimize the switching time. There are two possible switching times. They are (1) the Rising Edge 105a of CLOCK1 101, or (2) the Falling Edge 105b of CLOCK1 101. Switching from CLOCK2 102 to CLOCK1 101 is non-problematic because CLOCK2 102 is the slower of the two clocks. At any point of switching, CLOCK2 102 can transfer to CLOCK1 101, without interfering with the waveform of the pulse. A glitch can occur only when switching from CLOCK1 101 to CLOCK2 102, and particularly at the switching points, as will be shown in FIG. 1b and in FIG. 1c.

FIG. 1b illustrates a time relation between two clock sources, CLOCK1 101 and CLOCK2 102, and, a clock output signal, CLOCKout 103, along time axis 110, showing a glitch occurring at a switching point on the rising edge of CLOCK1 101. FIG. 1b illustrates Switching Point 117 between CLOCK1 101 and CLOCK2 102. Switching Point 117 occurs when CLOCK2 102 is at the zero ("0") level (i.e., the low voltage level) when a Rising Edge 114 of CLOCK1 101 occurs. The dotted line that is denoted with reference numeral 117 indicates the location of the Switching Point 117 between CLOCK1 101 and CLOCK2 102.

When the switching between the two clocks, CLOCK1 101 and CLOCK2 102, occurs on the Rising Edge 114 of CLOCK1 101, a glitch 116 (or short pulse 116) occurs if CLOCK2 102 is at the zero ("0") level at Switching Point 117 during that switch. Glitch 116 occurs due to the fact that the switching from the faster CLOCK1 101 to the slower CLOCK2 102 takes time, and during this period CLOCK1 101 drives the CLOCKout 103 signal to the one ("1") level (i.e., the high voltage level) and then CLOCK2 102 replaces CLOCK1 and drives the CLOCKout 103 signal to the zero ("0") level (i.e., the low voltage level).

FIG. 1c illustrates a time relation between two clock sources, CLOCK1 101 and CLOCK2 102, and a clock output signal, CLOCKout 103, along time axis 120, showing a glitch occurring at a switching point on the falling edge of CLOCK1 101. FIG. 1c illustrates Switching Point 127 between CLOCK1 101 and CLOCK2 102. Switching Point 127 occurs when CLOCK2 102 is at the one ("1") level (i.e., the high voltage level) when Falling Edge 124 of CLOCK1 101 occurs. The dotted line that is denoted with reference numeral 127 indicates the location of the Switching Point 127 between CLOCK1 101 and CLOCK2 102.

When the switching between the two clocks, CLOCK1 101 and CLOCK2 102, occurs on the Falling Edge 124 of CLOCK1 101, a glitch 126 (or short pulse 126) occurs if CLOCK2 102 is at the one ("1") level at Switching Point 127 during the switch. Glitch 126 occurs due to the fact that the switching from the faster CLOCK1 101 to the slower CLOCK2 102 takes time, and during this period CLOCK1 101 drives the CLOCKout 103 signal to the zero ("0") level (i.e., the low voltage level) and then CLOCK2 102 replaces CLOCK1 and drives the CLOCKout 103 signal to the one ("1") level (i.e., the high voltage level).

Figure 2:
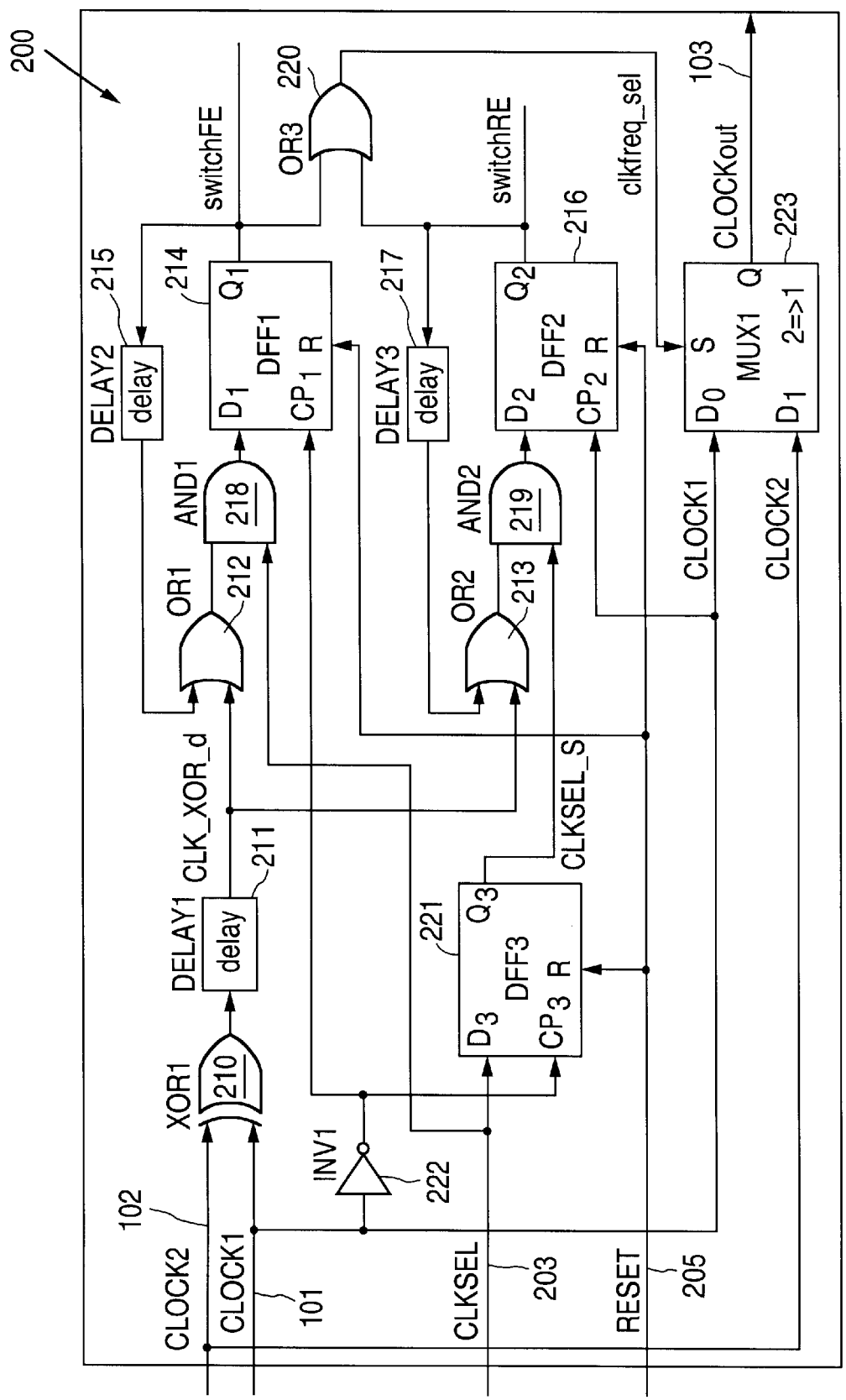
FIG. 2 illustrates a schematic diagram of an advantageous embodiment of a switching circuit of the present invention that is capable of switching between two clock sources without creating a glitch on the output of the switching circuit.

FIG. 2 illustrates a schematic diagram of an advantageous embodiment of a switching circuit 200 of the present invention that is capable of switching between two clock sources, CLOCK1 101 and CLOCK2 102, without creating a glitch. The input signals to switching circuit 200 comprise the signals from the two clocks, CLOCK1 101 and CLOCK2 102, a clock select signal CLKSEL 203 and a reset signal RESET 205. CLOCK2 102 is synchronized with CLOCK1 101 in a manner so that a Rising Edge of CLOCK2 102 follows a Rising Edge of CLOCK1 101, and a Falling Edge of CLOCK2 102 follows a Falling Edge of CLOCK1 101, as shown in FIG. 1a. Input signal CLKSEL 203 selects which of the two clocks, CLOCK1 101 or CLOCK2 102, will drive the output clock (i.e., the CLOCKout 103 signal) of switching circuit 200. The level of select signal CLKSEL 203 determines which clock is selected. When CLKSEL 203 is at the zero ("0") level (i.e., the low logic level), CLOCK1 101 is chosen to drive CLOCKout 103. When CLKSEL 203 is at the one ("1") level (i.e., the high logic level), CLOCK2 102 is chosen to drive CLOCKout 103. When the signal RESET 205 is at the one ("1") level (i.e., the high logic level), the signal RESET 205 resets the switching circuit 200 so that all the parameters in switching circuit 200 are set to their default values.

The two input clock signals, CLOCK1 101 and CLOCK2 102, are provided as inputs to exclusive OR gate 210 (designated XOR1). The output signal of XOR1 gate 210 is at a "high" logic level only if one of its inputs is at a "high" logic level. The output signal of XOR1 gate 210 is at a "low" logic level if both inputs are at a "high" logic level. The output signal of XOR1 gate 210 is provided to a delay unit 211 (designated DELAY1) that comprises any suitable delay components (for. example, a series of buffers). The output signal of delay unit DELAY1 211 is designated CLK__XOR__d. The CLK__XOR__d signal is provided to one input of a logical OR gate 212 (designated OR1) and to one input of a logical OR gate 213 (designated OR2).

Logical OR gate OR1 212 has two inputs. The. first input is the delayed signal CLK__XOR__d as described above. The second input is a feedback signal coming from an output Q1 of D Flip Flop 214 (designated DFFl) after the feedback signal has passed through a delay unit 215 (designated DELAY2) The output of logical OR gate OR1 212 is then provided to a logical AND gate 218 (designated AND1). The input signal CLKSEL 203 is provided as a second input to logical AND gate AND1 218. The output of logical AND gate AND1 218 is provided as input to D1 of DFF1 214.

Input CPl of DFF1 214 receives inverse values of CLOCK1 101 from inverter 222 (designated INV1). Receiving inverted values of CLOCK1 101 causes DFF1 214 to sample its D1 input on the Falling Edge of CLOCK1 101.

Logical OR gate OR2 213 has two inputs. The first input is the delayed signal CLK_XOR_d as described above. The second input is a feedback signal coming from the output Q2 of D Flip Flop 216 (designated DFF2) after the feedback signal has passed through a delay unit 217 (designated DELAY3). The output of logical OR gate OR2 213 is then provided to a logical AND gate 219 (designated AND2). An output signal CLKSEL_S from the Q3 output of a D Flip Flop 221 (designated DFF3) is provided as a second input to logical AND gate AND2 219. The output from logical AND gate AND2 219 is provided to the D2 input of DFF2 216. Input CP2 of DFF2 216 receives values of CLOCK1 101. Receiving values of CLOCK1 101 causes-DFF2 216 to sample its D2 input on the Rising Edge of CLOCK1 101.

The output of D Flip Flop DFF1 214 is a "switchFE" signal. The switchFE signal is used as a feedback signal to logical OR gate OR1 212.

The output of D Flip Flop DFF2 is a "switchRE" signal. The switchRE signal is used as a feedback signal to logical OR gate OR2 213.

In addition, the switchFE signal and the switchRE signal are provided as inputs to logical OR gate 220 (designated 220). The output signal of logical OR gate OR3 220 is a "clkfreq_sel" signal. The clkfreq_sel signal is used as a selector of multiplexer 223 (designated MUX1) to select which input of MUX1 223 (D0 with CLOCK1 101 or D1 with CLOCK2 102) will be selected to drive the output of MUX 223 (the CLOCKout 103 signal). When the clkfreq_sel signal is at a "low" logic level, then D0 is selected (i.e., CLOCK1 101 is selected as the CLOCKout signal) and when the clkfreq _sel signal is at a "high" logic level, then D1 is selected (i.e., CLOCK2 102 is selected as the CLOCKout signal).

RESET signal 205 resets the three D Flip Flops (DFF1 214, DFF2 216, and DFF3 221) of switching circuit 200.

Figure 3A:
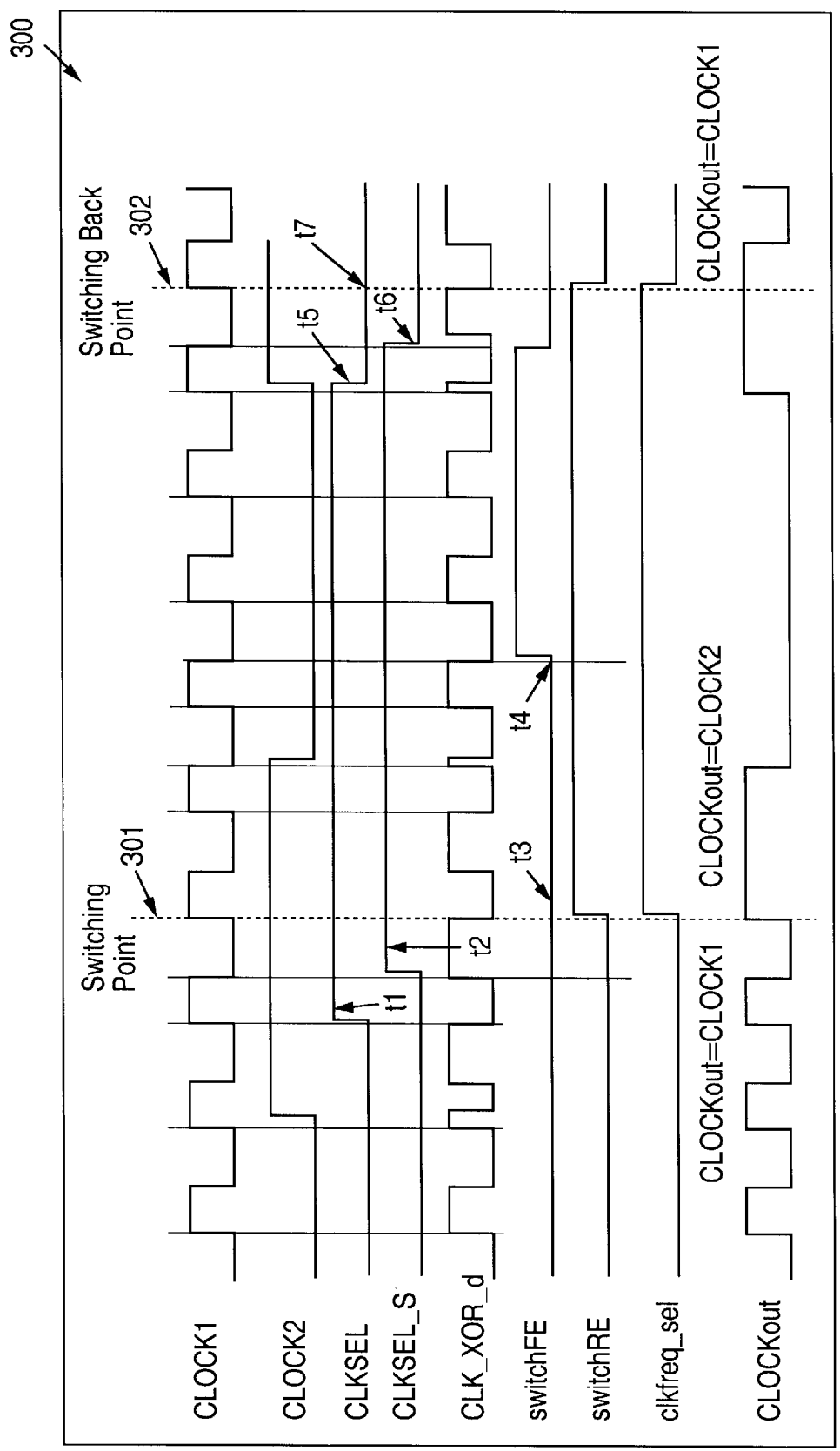
FIG. 3a illustrates a first timing diagram of clock signals and control signals of an advantageous embodiment of the present invention showing a time relation between two clock sources when a switch is made from a first clock source to a second clock source and then back again to the first clock source.
Figure 3B:
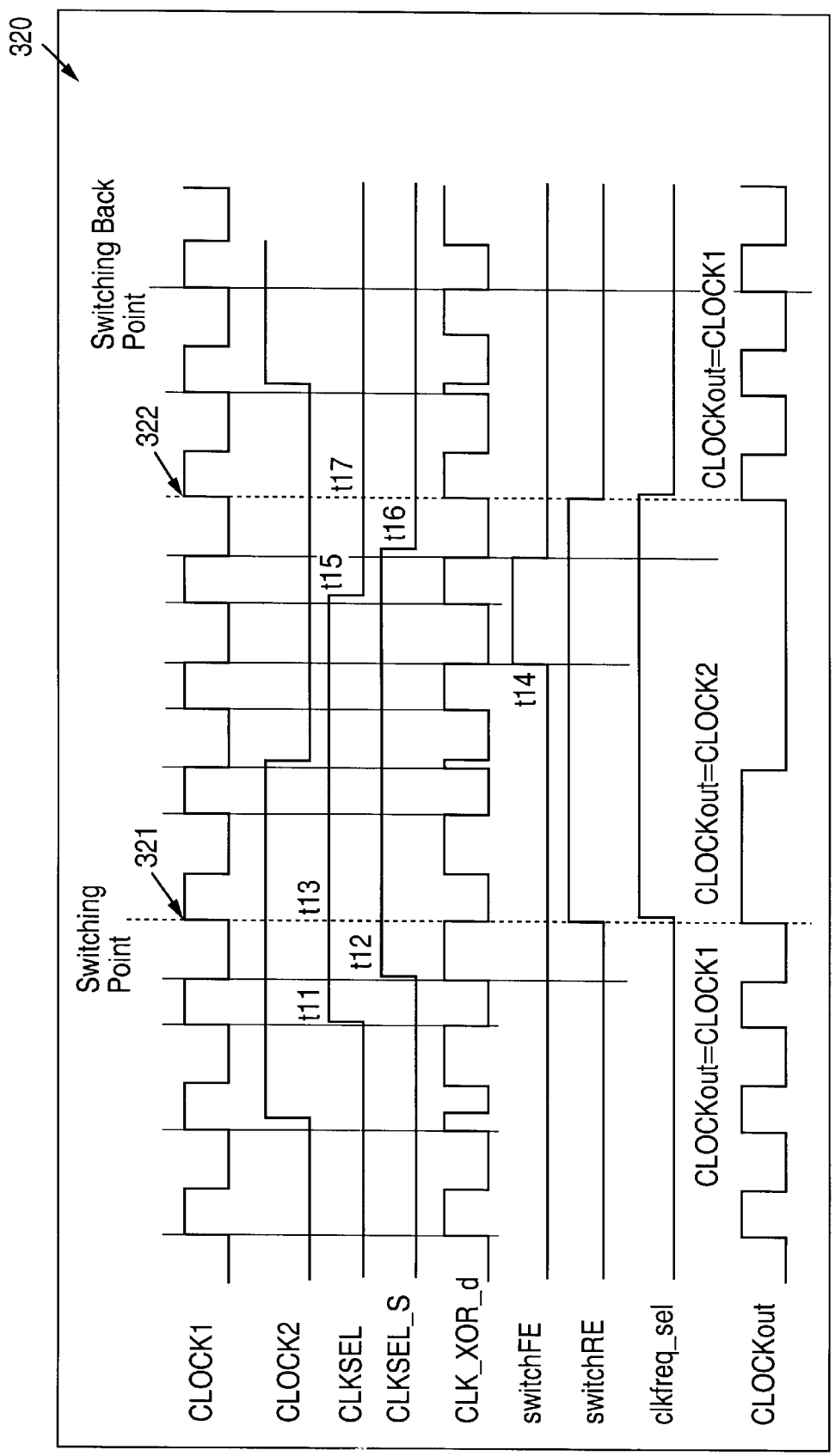
FIG. 3b illustrates a second timing diagram of clock signals and control signals of an advantageous embodiment of the present invention showing a time relation between two clock sources when a switch is made from a first clock source to a second clock source and then back again to the first clock source.
Figure 3C:
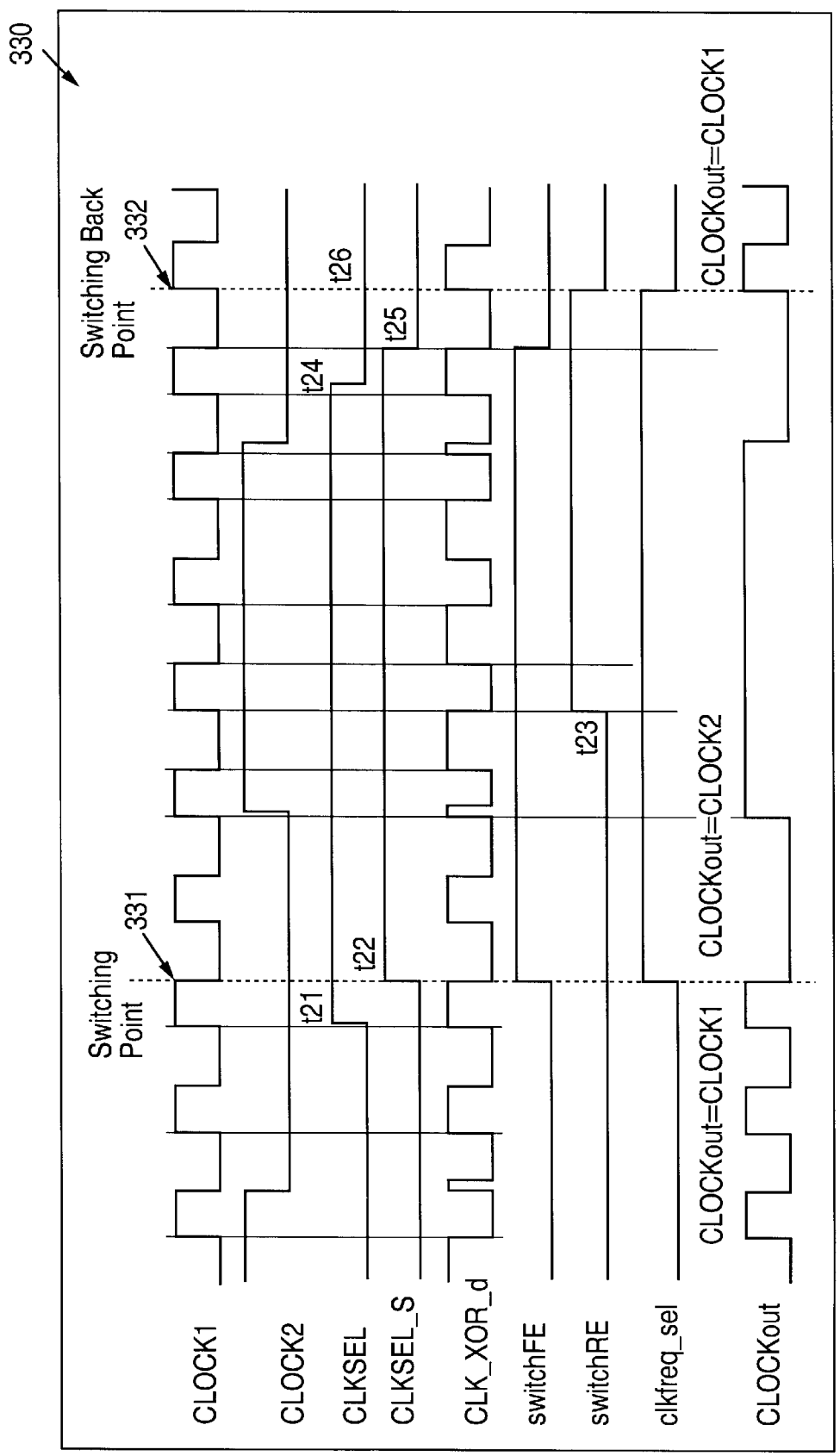
FIG. 3c illustrates a third timing diagram of clock signals and control signals of an advantageous embodiment of the present invention showing a time relation between two clock sources when a switch is made from a first clock source to a second clock source and then back again to the first clock source.

FIG. 3a, FIG. 3b and FIG. 3c illustrate timing diagrams of clock signals and control signals of switching circuit 200 showing how switching circuit 200 eliminates a glitch when switching circuit 200 switches between the two clock sources, CLOCK1 101 and CLOCK2 102, as they drive a given digital circuit (not shown). In FIG. 3a, FIG. 3b and FIG. 3c the high logic level will be designated as the one ("1") level and. the low logic level will be designated as the zero ("0") level.

FIG. 3a schematically illustrates timing diagram 300 of the switching circuit 200 when switching between two clocks. Timing diagram 300 shows Switching Point 301 where the switching is from CLOCK1 101 to CLOCK2 102 while CLOCK2 102 is at a one ("1") level. Timing diagram 300 also shows another Switching Point 302 where the switch is back from CLOCK2 102 to CLOCK1 101 when CLOCK2 102 is at a one ("1") level.

CLOCK2 102 has a lower frequency than CLOCK1 101. The Rising Edge of CLOCK2 102 is synchronized with the Rising Edge of CLOCK1 101. The Falling Edge of CLOCK1 102 is synchronized with Falling Edge of CLOCK1 101. The ratio between CLOCK1 101 and CLOCK2 102 can be any odd ratio. For example, a ratio of one to seven (1:7) makes CLOCK2 102 change its state for every three and one half (3.5) cycles of CLOCK1 101. Due to the fact that there is an odd ratio between the two clocks, CLOCK1 101 and CLOCK2 102, the Rising Edge and the Falling Edge of CLOCK2 102 are on different edges of CLOCK1 101.

At the initial state of switching circuit 200, the CLKSEL signal is at the zero ("0") level and CLOCK1 101 is chosen to drive CLOCKout 103 as the output signal from switching circuit 200 to a given digital circuit. At a Point of Time t1, the CLKSEL signal changes its value from the zero ("0") level to the one ("1") level while CLOCK2 102 is at the one ("1") level in order to switch CLOCKout 103 from CLOCK1 101 to CLOCK2 102. This change occurs after the Rising Edge of CLOCK1 101. At the Point of Time t1, the value of signal CLK_XOR_d is at the zero ("0") level. On the Falling Edge of CLOCK1 101 at the next Point of Time t2, both the switchFE signal and the switchRE signal remain at the zero ("0") level, and the CLKSEL signal is sampled into D Flip Flop DFF3 221 to set the value of the CLKSEL_S signal. When CLOCK1 101 is at the zero ("0") level and CLOCK2 102 is at the one ("1") level, the CLK_XOR_d signal rises to the one ("1") level and on the Rising Edge of CLOCK1 101 at Point of Time t3 the output signal switchRE from D Flip Flop DFF2 216 is set to the one ("1") level, indicating that a switch from CLOCK1 101 to CLOCK2 102 should occur when CLOCK1 101 is at the one ("1") level. The signal switchRE will set the clkfreq_sel signal to the one ("1") level causing multiplexer MUX1 223 to choose the input from multiplexer input D1 (i.e., the CLOCK2 102 signal) to drive CLOCKout 103. Since both clocks, CLOCK1 101 and CLOCK2 102, are at the one ("1") level, then the switching from CLOCK1 101 to CLOCK2 102 on CLOCKout 103 will not cause any glitch. When CLOCK2 102 has fallen. from the one ("1") level to the zero ("0") level, the switchFE signal is set to the one ("1") level at Point of Time t4, but this will not cause any unwanted effect or glitch, because CLOCK2 102 already provides the CLOCKout 103 signal.

At Point of Time t5, the CLKSEL signal falls back to the zero ("0") level, in order to select CLOCK1 101 to drive CLOCKout 103. This happens while CLOCK2 102 rises from the zero ("0") level to the one ("1") level, so that the switchFE signal is reset to the zero ("0") level at Point of Time t6 and the switchRE signal is reset to the zero ("0") level at Point of Time t7. The clkfreq_sel signal will fall to the zero ("0") level at Point of Time t7, but only after the switchFE signal falls to the zero ("0") level. At Point of Time t7, multiplexer MUX1 223 selects CLOCK1 101 (from multiplexer input DO) to drive CLOCKout 103 without having any glitch on the output of CLOCKout 103.

FIG. 3b schematically illustrates timing diagram 320 of switching circuit 200 when switching between the two clock sources. Timing diagram 320 shows Switching Point 321 where the switch is from CLOCK1 101 to CLOCK2 102 when CLOCK2. 102 is at the one ("1") level. Timing diagram.320 also shows another Switching Point 322 where the switch is back from CLOCK2 102 to CLOCK1 101 when CLOCK2 102 is at the zero ("0") level. The first switch from CLOCK1 101 to CLOCK2 102 when CLOCK2 102 is at the one ("1") level (from Point of Time t11 to Point of Time t13) is the same as the switch previously described for FIG. 3a. No glitches occur.

At Point of Time t17, the switch from CLOCK2 102 to CLOCK1 101 occurs when CLOCK2 is at the zero ("0") level. This switch does not generate a glitch because CLOCK1 101 rises from the zero ("0") level to the one ("1") level and CLOCKout 103 rises from the zero ("0") level to the one ("1") level as well.

FIG. 3c schematically illustrates timing diagram 330 of switching circuit 200 when switching between the two clock sources. Timing diagram 330 shows Switching Point 331 where the switch is from CLOCK1 101 to CLOCK2 102 when CLOCK2 102 is at the zero ("0") level. Timing diagram 330 also shows another Switching Point 332 where the switch is back from CLOCK2 102 to CLOCK1 101 when CLOCK2 102 is at the zero ("0") level. At Point of Time t21, when CLOCK2 102 is at the zero ("0") level, the CLKSEL signal is set to the one ("1") level and at Point of Time t22, the CLKSEL_S signal is set to the one ("1") level. Because the CLK_XOR_d signal is at the one ("1") level, then the switchFE signal is set to the one ("1") level, which causes the clkfreq_sel signal to rise to the one ("1") level. Setting the clkfreq_sel signal to the one ("1") level causes multiplexer MUX1 223 to choose the input from multiplexer input D1 (i.e., the CLOCK2 102 signal) to drive the CLOCKout 103 signal.

Because both clocks, CLOCK1 101 and CLOCK2 102, are at the zero ("0") level, then the switch from CLOCK1 101 to CLOCK2 102 will not cause any glitch on CLOCKout 103. At Point of Time t23, the switchRE signal is set to the one ("1") level. Although, at Point of Time t25 the CLKSEL_S signal is set to the zero ("0") level, the CLOCKout 103 signal will not switch back to CLOCK1 101. The switching back to CLOCK1 101 will occur only when the Point of Time t26 is reached at which point the switchRE signal is reset to the zero ("0") level. At the Point of Time t26 the CLOCKout 103 signal is switched back from CLOCK2 102 to CLOCK1 101 without any glitches.

It is important to mention that CLOCK2 102 may be generated from CLOCK1 101 by an external circuit (not shown).

When a first logic level is at the one ("1") level and a second logic level is also at the one ("1") level, the two logic levels are said to be similar. When a first logic level is at the zero.("0") level and a: second logic level is also at the zero ("0") level, the two logic levels are also said to be similar.

When a first logic level is at the one ("1") level and a second logic level is at the zero ("0") level, the two logic levels are said to be different. When a first logic level is at the zero ("0") level and a second logic level is at the one ("1") level, the two logic levels are also said to be different.

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for providing at an output of a logic circuit a smooth transition between a first clock signal at a first frequency and a second clock signal at lower second frequency wherein said first clock signal and said second clock signal are timed so that a rising edge of said second clock signal occurs after a rising edge of said first clock signal and a falling edge of said second clock signal occurs after a falling edge of said first clock signal, said method comprising the steps of:

generating a pulse having a first logic level that indicates that a logic level of said first clock signal and a logic level of said second clock signal are similar, said pulse having a second logic level that indicates that a logic level of said first clock signal and a logic level of said second clock signal are different;

synchronizing a rising/falling edge of said pulse with a rising/falling edge of said first clock signal;

detecting a change in a logic level of a command signal that indicates a command to switch between said first clock signal and said second clock signal;

identifying a first time period after detecting said change in said logic level of said command signal in which said pulse is in its second logic level; and allowing a transition between said first clock signal and said second clock signal immediately after said first time period has ended.

2. The method as claimed in claim 1 wherein the step of synchronizing a rising/falling edge of said pulse with a rising/falling edge of said first clock signal comprises the steps of:

inserting at least one delay element into at least one signal path of said pulse; and inserting at least one delay element into at least one signal path of said first clock signal.

3. The method as claimed in claim 1 wherein said transition between said first clock signal and said second clock signal occurs after a rising/falling edge of said first clock signal.

4. The method as claimed in claim 1 wherein said step of generating said pulse comprises the step of:

applying an exclusive OR operation to said first clock signal and to said second clock signal.

5. The method as claimed in claim 1 further comprising the step of:

causing one of said first clock signal and said second clock signal to appear at an output of said logic circuit before a transition occurs between said first clock signal and said second clock signal.

6. method as claimed in claim 5 wherein said step of causing one of said first clock signal and said second clock signal to appear at an output of said logic circuit before a transition occurs between said first clock signal and said second clock signal comprises the steps of:

inputting a reset signal into said logic circuit; and inputting a command signal into said logic circuit.

7. An apparatus for providing at an output of a logic circuit a smooth transition between a first clock signal at a first frequency and a second clock signal at a lower second frequency wherein said first clock signal and said second clock signal are timed so that a rising edge of said second clock signal occurs after a rising edge of said first clock signal and a falling edge of said second clock signal occurs after a falling edge of said first clock signal, said apparatus comprising:

circuitry for generating a pulse having a first logic level that indicates that a logic level of said first clock signal and a logic level of said second clock signal are similar, said pulse having a second logic level that indicates that a logic level of said first clock signal and a logic level of said second clock signal are different;

circuitry for synchronizing a rising/falling edge of said pulse with a rising/falling edge of said first clock signal;

circuitry for detecting a change in a logic level of a command signal that indicates a command to switch between said first clock signal and said second clock signal;

circuitry for identifying a first time period after detecting said change in said logic level of said command signal in which said pulse is in its second logic level; and circuitry for causing a transition between said first clock signal and said second clock signal immediately after said first time period has ended.

8. The apparatus as claimed in claim 7 comprising:

at least one delay element in at least one signal path of said pulse.

9. The apparatus as claimed in claim 8 wherein said at least one delay element is a buffer.

10. The apparatus as claimed in claim 7 comprising:
   at least one delay element in at least one signal path of said first clock signal.

11. The apparatus as claimed in claim 10 wherein said at least one delay element is a buffer.

12. The apparatus as claimed in claim 7 comprising an exclusive XOR gate for generating said pulse from said first clock signal and from said second clock signal.

13. The apparatus as claimed in claim 7 further comprising:
   a multiplexer for outputting one of said first clock signal and said second clock signal at an output of said logic circuit;
   a first circuit for identifying a first time period after detecting a change in a logic level of said command signal, after which a clock signal transition is applied at a first rising edge of said first clock signal;
   a second circuit for identifying a first time period after detecting a change in a logic level of said command signal, after which a clock signal transition is applied at a first falling edge of said first clock signal.

14. The apparatus as claimed in claim 13 further comprising a delay circuit for delaying a command signal that is input to said second circuit up to one half of a cycle of said first clock signal.

15. The apparatus as claimed in claim 7 comprising circuitry for switching between a first clock signal and a second clock signal in which a rising edge of the slower of said first clock signal and said second clock signal is synchronized to a rising edge of the faster of said first clock signal and said second clock signal.

16. The apparatus as claimed in claim 7 comprising circuitry for switching between a first clock signal and a second clock signal in which a falling edge of the slower of said first clock signal and said second clock signal is synchronized to a falling edge of the faster of said first clock signal and said second clock signal.

17. The apparatus as claimed in claim 7 wherein said circuitry is capable of switching from a first clock signal to a slower second clock signal without creating a glitch.

18. The apparatus as claimed in claim 17 wherein said circuitry is capable of switching from said first clock signal to said slower second clock signal when said slower second clock signal is at a high logic level without creating a glitch.

19. The apparatus as claimed in claim 17 wherein said circuitry is capable of switching from said first clock signal to said slower second clock signal when said slower second clock signal is at a low logic level without creating a glitch.

20. The apparatus as claimed in claim 7 wherein a ratio of a frequency of said first clock signal to a frequency of said second clock signal is an odd ratio.

* * * * *